United States Patent [19]

Kulik

[11] Patent Number: 4,696,420

[45] Date of Patent: Sep. 29, 1987

[54] OXYGEN CARRIER

[76] Inventor: Helmut Kulik, 169 Green Pond Rd., Rockaway, N.J. 07866

[21] Appl. No.: 800,170

[22] Filed: Jan. 17, 1986

[51] Int. Cl.[4] .......................... B60R 7/00; A47C 7/62

[52] U.S. Cl. ................................ 224/275; 224/42.43; 280/289 WC; 297/DIG. 4

[58] Field of Search ..................... 224/273, 275, 42.38, 224/42.39, 42.45 R, 42.43, 42.42, 42.44; 280/289 WC; 297/DIG.4, 188, 191

[56] References Cited

U.S. PATENT DOCUMENTS

| | | | |
|---|---|---|---|
| 991,192 | 5/1911 | Battenfeld | 224/42.39 X |
| 1,018,696 | 2/1912 | Cronk | 224/273 |
| 1,288,839 | 12/1918 | Conrad et al. | 224/42.38 X |
| 1,568,014 | 12/1925 | Watson | 224/42.38 |
| 1,628,771 | 5/1927 | Frisk | 224/42.39 |
| 2,639,208 | 5/1953 | Obenchain | 224/42.38 X |
| 2,822,969 | 2/1958 | Cooper | 224/42.39 X |
| 3,508,732 | 4/1970 | Trachtenberg et al. | 224/42.45 R X |
| 3,815,388 | 6/1974 | Nichol et al. | 224/42.38 X |
| 4,006,852 | 2/1977 | Pilsner et al. | 224/42.25 R X |
| 4,045,044 | 8/1977 | Bierer | 297/188 X |
| 4,213,648 | 7/1980 | Steichen | 297/188 |
| 4,431,206 | 2/1984 | Pryor | 280/289 WC |
| 4,506,903 | 3/1985 | Bowermaster | 280/289 WC |
| 4,577,903 | 3/1986 | Wells | 297/188 |

*Primary Examiner*—Stephen Marcus
*Assistant Examiner*—Robert M. Petrik

[57] ABSTRACT

A device is disclosed for detachably coupling an oxygen carrier to wheelchair such that they are transportable together as a unit without the need of a separate operator of the cart. The device fits between the downwardly directed support arms of the wheelchair. The carrier is made in different lengths depending on the size of the wheelchair. In the only embodiment the oxygen tank or tanks are supported entirely on the wheel chair by the device.

1 Claim, 3 Drawing Figures

OXYGEN CARRIER

BACKGROUND AND SUMMARY OF THE INVENTION

In the field of patient care, it is often necessary to transport a patient in a wheelchair while the patient is conected to an oxygen tank. Some devices are quite cumbersome and mounted on wheeled carts designed for transport of the tanks. When it necessary to transport a patient while having oxygen available or while administering it to the patient, an additional person is required for manipulating the cart and maintaining an oxygen line to the patient. For this it requires two people—one to push the wheelchair and the other to push the oxygen cart. Not only is there a need for two people instead of one in such an arrangment, but there is the increased danger of the oxygen line being disconnected since the two persons have to coordinate their efforts side-by side so that there is no jerking or pulling of the oxygen line running between the cart mounted bottles and the patient in the wheelchair.

It is known to provide a clamping device for direct attachment to a wheelchair; but such devices do not provide for ease of mounting and removal required by collapsible wheelchairs.

This invention was designed for people with respiratory or cardiac problems. Usually people that required bottled oxygen, whether it be circumstantial or permanent, use a wheelchair for long outings (shopping, walks etc.) to prevent exhaustion, although they are ambulatory. Presently these people must either carry the oxygen bottles with them or push them on an additional cart along side of them which obviosly is quite cumbersome. This device eliminates that problem. It is a tray that supports 2-3 oxygen bottles. It is fitted in the back of the wheelchair, between the handles extending to the ground. This prevents it from getting in the way, even if the wheelchair is being pushed, but it is still easily accessible. Because this device can cary up to three bottles. (if desired), the user can leave their homes or hospitals more often. This device can also be helpful in hospitals to transport patients from place to place since no additional person is needed for manipulation of the cart during transport of a patient. Further more, this can be done without worry of running out of bottled oxygen.

A further object of the invention is to provide an oxygen tank wheelchair attaching device which folds and stores easily when the wheelchair is collapsed.

The exciting thing about this invention is simplicity. The device already is assembled. Nothing more need be done. To use, first hold the folded tray with the hinge at the bottom longer side on the right, the shorter on the left. The tray will be place on the back of the wheelchair, between the wheels, about 8 to 12 inches above the ground. On the left and right side of the tray there are two indentations which will fit around the metal pipes of the wheelchair.

Unfold the tray, and fit the tray in place, by pushing down and opening the hinge as much as possible. The tray will be now parallel to the ground. There are now three distictive holes visible. Under the tray, around the holes are metal bands connected with allan screws. Place the desired number of bottles in the holes and tighten to allan screws to fasten the bottles.

DESCRIPTION OF THE PREFERRED EMBODIMENT

The object of the invention is to provide an attachment device for a wheelchair which will totally support the tray with all the oxygen bottles needed, moving in tandem with the wheelchair. This device already will be assembled, made of light aluminum, the collapsable tray to hold two or three bottles depending on the size of the wheelchair.

To use first hold the folded tray with hinge at the bottom longer side on the right, the shorter on the left. The tray will be placed on the back of the wheelchair, between the wheels, about 8 to 12 inches above the ground. On the left and right side of the tray there are two indentations which will fit around the metal pipes of the wheel chair. Unfold the tray, and fit the tray in place, by pushing down and opening the hinge as much as possible. The tray will be now parrallel to the ground. There are now two or three distinctive holes visible. Around the holes are metal bands conected with allan screws. Place the desired number of bottles in the holes and tighten the allan screws to fasten the bottles in place.

No additional person is necessary to manipulate the cart. By such an arrangment either the patient or a person pushing the wheelchair may direct the wheelchair without having to worry about manipulation of the oxygen tank tray. In another embodiment the weight of the tray and tanks are totally supported by the wheelchair through use of the attachment device.

DETAILED DESCRIPTION OF THE DRAWINGS

Figure 1:
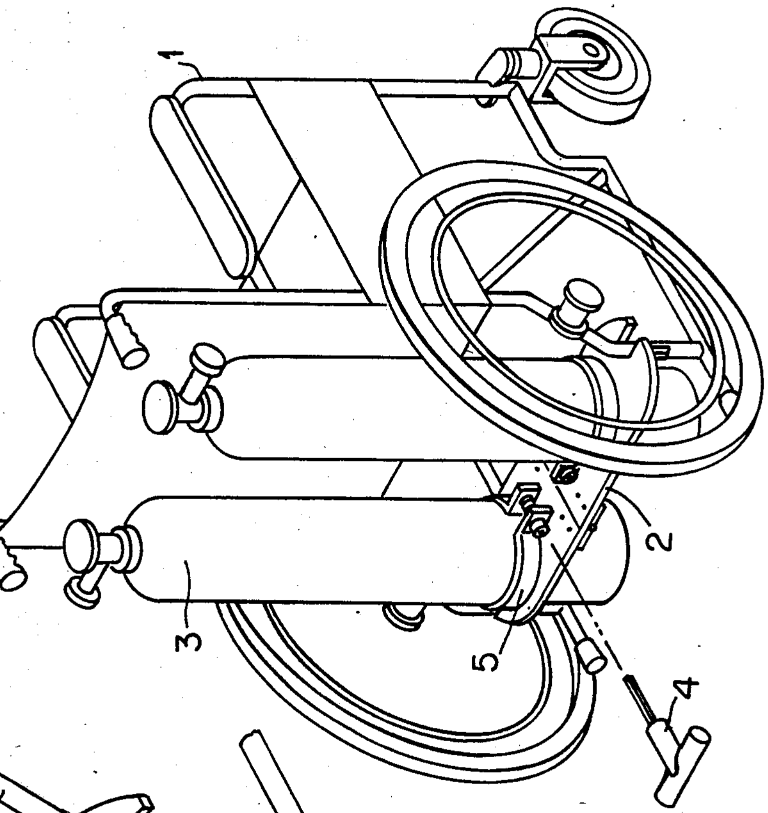
FIG. 1 is an overall back view of the oxygen carrier in position.

FIG. 1 shows how two portable oxygen tanks 3 which are attached to the carrier using only the allen wrench (4) to tighted the screw (10) on the clamp (5). It also shows that the carrier (2) does not interfer with the rest of the wheelchair.

Figure 2:
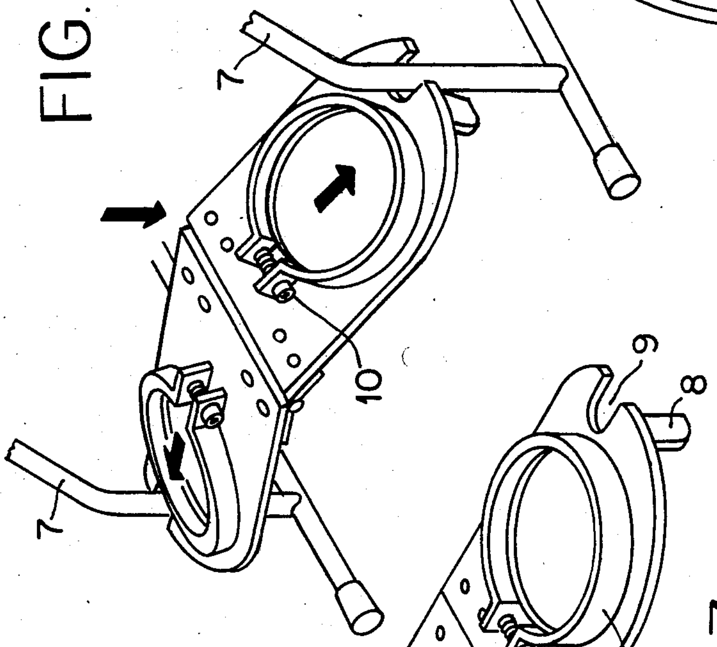
FIG. 2 is a view of how the carrier is attached to the chair.

FIG. 2 shows the actual bending of the carrier to allow the carrier to be attached to the wheelchair.

Figure 3:
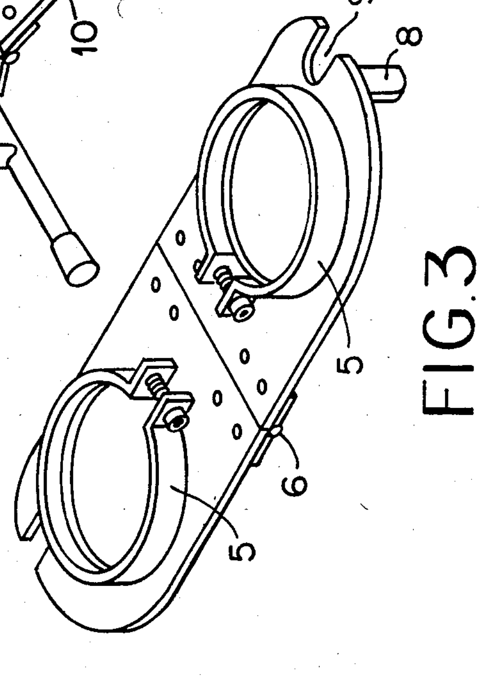
FIG. 3 is a view of the major components.

FIG. 3 shows the hinge (6) for the bending of the carrier. It also shows two special features. First, the notch (9) in the carrier for the wheelchair supports (7) to fit in. Secondly, a tilting stablizer (8) to maintain the oxygen tanks in an upright position.

I claim:

1. An oxygen tank carrier for use on a wheelchair, said wheelchair including two downwardly directed support arms on which the rear wheels are supported, said oxygen tank carrier comprising, two plates hinge together, each plate including a notch at the end farthest from the hinge, said notches engaging said downwardly directed support arms, said plates are pushed down in between said support arms, said plates including holes therein to accommodate an oxygen tank, each hole having a clamp associated therewith to secure the oxygen tank to said carrier, each said clamp being tighted to the tank with an Allan wrench and associated Allan screw.

* * * * *